H. W. SNEDEN.
MOTOR VEHICLE AXLE CONSTRUCTION.
APPLICATION FILED AUG. 27, 1912.
1,149,095.
Patented Aug. 3, 1915.
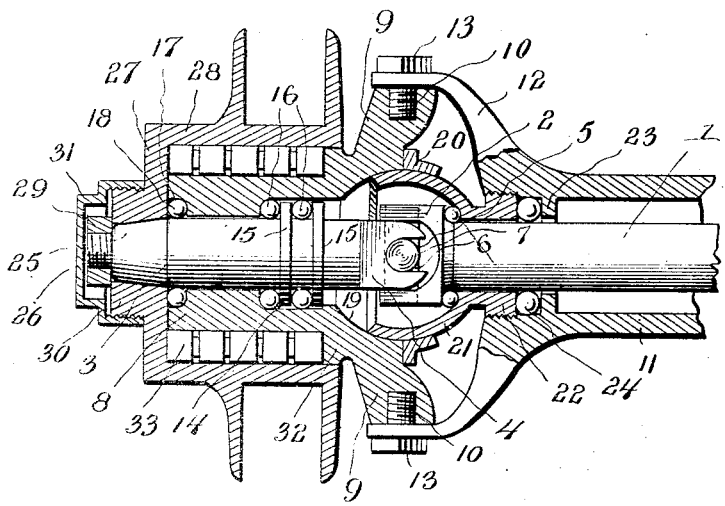
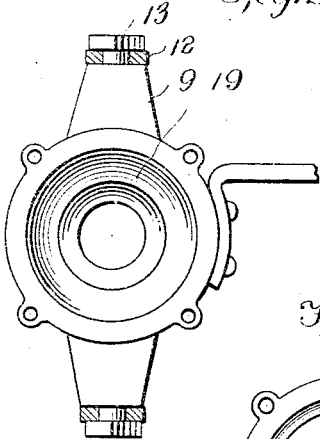
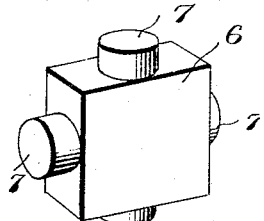
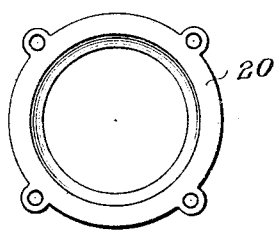
Witnesses
William Smith
John J. McCarthy
Inventor
H. W. Sneden.
By Victor J. Evans
Attorney

UNITED STATES PATENT OFFICE.

HERMAN W. SNEDEN, OF BYRON CENTER, MICHIGAN.

MOTOR-VEHICLE AXLE CONSTRUCTION.

1,149,095.

Specification of Letters Patent. Patented Aug. 3, 1915.

Application filed August 27, 1912. Serial No. 717,369.

*To all whom it may concern:*

Be it known that I, HERMAN W. SNEDEN, a citizen of the United States of America, residing at Byron Center, in the county of Kent and State of Michigan, have invented new and useful Improvements in Motor-Vehicle Axle Construction, of which the following is a specification.

This invention relates to certain novel and useful improvements in running gear construction and has particular application to a construction of forward axle for motor vehicles whereby power may be applied to the steering wheels of the vehicle.

In carrying out the present invention, it is my purpose to provide a construction of forward axle for motor vehicles which will be constructed in such manner that the entrance of dust, dirt and other foreign matter to the movable parts of the axle will be entirely eliminated.

It is also my purpose to provide a device of the class described which will embrace the desired features of simplicity, efficiency and durability coupled with cheapness of cost in manufacture and marketing and which may be applied to any type of motor vehicle now in use.

Furthermore, I aim to provide a construction of forward axle for motor vehicles whereby power may be applied to the steering wheels of the vehicle and wherein the steering connections between the wheel spindle and the axle will coöperate with the universally movable connection between such wheel spindle and the driving shaft to present a universal joint and hold the parts assembled.

With the above and other objects in view, the invention consists in the construction, combination and arrangement of parts hereinafter set forth in and falling within the scope of the claims.

In the accompanying drawing, Figure 1 is a fragmentary longitudinal sectional view through a vehicle axle constructed in accordance with the present invention, parts being shown in elevation. Fig. 2 is an end elevation of the stationary boxing or sleeve surrounding the wheel spindle. Fig. 3 is a perspective view of the pivot block, and Fig. 4 is a perspective view of a guard used in conjunction with the boxing or sleeve.

Referring now to the accompanying drawing in detail, the numeral 1 indicates the driving shaft connected up in any suitable manner to the propelling motor of the vehicle. As each end of the driving shaft 1 is identical in construction to the other end and as the connections between the wheel hub and the axle are the same at each end of the latter, a description and showing of one end of the axle is deemed sufficient for the purposes of this invention.

Each end of the driving shaft 1 is equipped with a yoke 2 having the limbs thereof slotted, while coaxial with the respective end of the driving shaft is a spindle 3 equipped at its inner end with a yoke 4 disposed at right angles to the plane of the yoke on the shaft 1 and having the limbs thereof slotted as at 5. Interposed between the limbs of the yokes 2 and 4 is a pivot block 6 provided with pairs of pivot pins 7, the pins of each pair being coaxial with each other and intersecting the pins of the other pair at right angles and are disposed within the slotted limbs of the yokes, thereby providing a universally movable connection between the spindle and driving shaft. Surrounding the spindle 3 and of less length than the latter is a stationary sleeve or boxing 8 provided at one end with diametrically opposed outwardly extending arms 9, 9 each having a threaded bore 10 in the free end thereof, while encircling the driving shaft 1 is an axle sleeve 11 carrying, adjacent to the arms 9, 9, a yoke 12. The free ends of the limbs of the yoke 12 are provided with apertures designed to register with the bores 10 in the arms 9, 9 and through these registering apertures and bores is passed a headed pivot pin 13. Formed in the inner wall of the sleeve or boxing 8 at the inner end thereof is an annular groove 14, and formed on the spindle 3 are collars 15, 15 suitably spaced apart and disposed within the groove 14 and coöperating with the wall of said groove to form race ways for the reception of anti-friction bearings 16, while the boxing at its opposite end is provided with an annular groove 17 coöperating with the adjacent portion of the spindle to form a race way for anti-friction bearings 18.

By means of the construction just described, it will be seen that the steering connection, formed by the arms 9, 9 and the limbs of the yoke 12, between the spindle 3 and the driving shaft 1 serves to hold the parts of the universal connection between the adjacent ends of the spindle and driving shaft assembled and coöperates with such parts to present a universal joint, while the anti-friction bearings 16, 16 prevent inward movement of the boxing on the spindle thereby insuring the spindle and boxing against relative lateral movement in the swinging thereof.

In order to prevent dirt, dust and other foreign matter from entering the universal connection between the proximate ends of the spindle and driving shaft, 1 form in the inner end of the boxing a socket 19 and bolt or otherwise fasten to the edge of the wall of such socket a guard 20 curved in cross section, as shown in Fig. 1, to form a continuation of the socket 19. Previous to fastening or applying the guard 20 to the wall of the socket, I mount within the latter, what may be termed, a hollow ball 21 designed to inclose the connection between the spindle and driving shaft and fitted within the socket 19 in such manner that the boxing may move freely in the steering of the vehicle. Extending outwardly from the hollow ball 21 is a threaded nipple 22 threaded into the adjacent end of the axle sleeve 11 and surrounding the driving shaft 1, the free end of the nipple 22 coöperating with an inwardly extending ring 23 formed in the axle sleeve 11 to form a race way for anti-friction bearings 24. Thus, it will be seen that, the connection between the spindle and driving shaft is effectively protected against the entrance of foreign matter.

The free end of the spindle 3 is preferably tapered as at 25 and thence extended outwardly in the form of a threaded shank 26 and such tapered portion of the spindle is disposed within a correspondingly shaped opening in the end plate 27 of a wheel hub 28, a nut 29 being threaded onto the shank 26 and engaged with the end plate 27 of the wheel hub to hold the latter upon the boxing or sleeve 8. The end plate 27, concentrically of the adjacent extremity of the spindle 3, is preferably formed to provide a threaded extension 30 to receive a cover plate 31, the latter incasing the nut 29 and the threaded shank 26 of the spindle.

It will be noted that the anti-friction bearings 17 bear against the adjacent portion of the end plate 27 of the wheel hub and so act as thrust bearings to eliminate friction between the free end of the boxing 8 and the inner wall of the end plate 27. An annular flange 32 is preferably formed on the outer surface of the boxing 8 at the juncture of the latter with the arms 9 and such flange is designed to receive the inner open end of the hub 28 and coöperates with the opposite portion of the inner face of the end plate 27 and the confronting faces of the wheel hub and boxing to form a race way for roller bearings or other anti-friction bearings 33.

From the foregoing description taken in connection with the accompanying drawing, the construction, mode of operation and manner of assembling my invention will be readily apparent. It will be seen that I have provided a construction of forward axle for motor vehicles whereby power may be applied to the steering wheels of the vehicle and wherein the universally movable connection between the meeting ends of the driving shaft and wheel spindle are protected against the entrance of dust, dirt and other foreign matter.

I claim:

In combination a driving shaft, a spindle coaxial with said driving shaft, a universal connection between said spindle and shaft, a boxing surrounding said spindle, a sleeve axle surrounding said drive shaft and having an internally threaded inner end, a ring formed interiorly of the sleeve axle and in adjacent relation to its internally threaded end, a hollow ball provided with an outwardly extended threaded nipple and adapted to threadedly engage with the internally threaded end of said sleeve axle and terminating in spaced relation to said ring to form a raceway, the said hollow ball forming a guard for said universal connection, the inner end of said boxing being provided with a socket for receiving the hollow ball, and a guard embracing the hollow ball and secured to the end wall of the inner end of the socket and providing a continuation of the same.

In testimony whereof I affix my signature in presence of two witnesses.

HERMAN W. SNEDEN.

Witnesses:
W. E. PALMER,
BENNETT S. JONES.